(12) United States Patent
Austin et al.

(10) Patent No.: US 12,406,572 B2
(45) Date of Patent: Sep. 2, 2025

(54) SYSTEMS AND METHODS FOR SYNCHRONIZING THE PRESENTATION OF VEHICLE EXTERIOR LIGHTS

(71) Applicant: Toyota Motor Engineering & Manufacturing North America, Inc., Plano, TX (US)

(72) Inventors: Benjamin Piya Austin, Saline, MI (US); Rohit Gupta, Santa Clara, CA (US); William Patrick Garrett, Plymouth, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/526,111

(22) Filed: Dec. 1, 2023

(65) Prior Publication Data
US 2025/0182613 A1  Jun. 5, 2025

(51) Int. Cl.
*G08G 1/005* (2006.01)
*B60Q 1/14* (2006.01)
(Continued)

(52) U.S. Cl.
CPC ............. *G08G 1/005* (2013.01); *B60Q 1/143* (2013.01); *B60Q 1/38* (2013.01); *G08G 1/162* (2013.01);
(Continued)

(58) Field of Classification Search
None
See application file for complete search history.

(56) References Cited

U.S. PATENT DOCUMENTS 9,013,293 B2   4/2015   Pimentel
9,047,703 B2   6/2015   Beckwith et al.
(Continued)

FOREIGN PATENT DOCUMENTS

CN   110466529 A   11/2019
CN   112277789 A   1/2021
(Continued)

OTHER PUBLICATIONS

Jasoren. "How AR works and what it is—Jasoren", Retrieved from the Internet: <https://jasoren.com/what-augmented-reality-is-and-how-it-works-the-ultimate-tutorial/>, Retrieved Dec. 1, 2023.

*Primary Examiner* — Muhammad Adnan
(74) *Attorney, Agent, or Firm* — Christopher G. Darrow; Darrow Mustafa PC

(57) ABSTRACT

Systems, methods, and other embodiments described herein relate to synchronizing the presentation of vehicle exterior lights to reduce the sensory overload of a pedestrian. In one embodiment, a method includes assessing a sensory environment of a pedestrian. The method also includes determining that the pedestrian is in a sensory-overloaded state based on a characteristic of the sensory environment and sensor data indicative of a pedestrian state of mind. The method also includes synchronizing a presentation of a first vehicle exterior light and a presentation of a second vehicle exterior light based on a determination that the pedestrian is in the sensory-overloaded state.

21 Claims, 8 Drawing Sheets

(51) Int. Cl.
*B60Q 1/38* (2006.01)
*G08G 1/16* (2006.01)

(52) U.S. Cl.
CPC ......... *G08G 1/166* (2013.01); *B60Q 2300/45* (2013.01)

(56) References Cited

U.S. PATENT DOCUMENTS

| | | | |
|---|---|---|---|
| 9,662,015 B2 | 5/2017 | Proud et al. | |
| 9,751,534 B2 | 9/2017 | Fung et al. | |
| 9,881,503 B1 | 1/2018 | Goldman-Shenhar et al. | |
| 10,046,618 B2 | 8/2018 | Kirsch et al. | |
| 10,235,882 B1 | 3/2019 | Aoude et al. | |
| 10,351,050 B1 * | 7/2019 | Elwell | F21S 41/141 |
| 10,547,988 B2 | 1/2020 | Oh et al. | |
| 10,777,083 B2 | 9/2020 | Rau et al. | |
| 10,850,746 B2 | 12/2020 | Marti et al. | |
| 10,885,785 B2 | 1/2021 | Xu et al. | |
| 10,911,915 B2 | 2/2021 | Woo et al. | |
| 11,021,103 B2 | 6/2021 | Haar et al. | |
| 11,172,492 B2 | 11/2021 | Zhang et al. | |
| 11,260,791 B2 | 3/2022 | Leaming et al. | |
| 11,533,586 B2 | 12/2022 | Balasubramanian et al. | |
| 11,571,969 B2 | 2/2023 | Domeyer et al. | |
| 2005/0024196 A1 | 2/2005 | Moore | |
| 2005/0117364 A1 | 6/2005 | Rennick et al. | |
| 2012/0212320 A1 * | 8/2012 | Oberholtzer | B60Q 1/52 340/3.2 |
| 2017/0315825 A1 | 11/2017 | Gordon et al. | |
| 2021/0046822 A1 | 2/2021 | Kleen et al. | |
| 2021/0287551 A1 | 9/2021 | Pedersen | |
| 2021/0403039 A1 | 12/2021 | Horigome et al. | |
| 2022/0256255 A1 | 8/2022 | Dixit | |
| 2022/0363264 A1 | 11/2022 | Bilal et al. | |
| 2023/0056390 A1 | 2/2023 | Balasubramanian et al. | |
| 2023/0186983 A1 | 6/2023 | Grover et al. | |
| 2023/0194899 A1 | 6/2023 | Su et al. | |

FOREIGN PATENT DOCUMENTS

| | | | |
|---|---|---|---|
| CN | 112566340 A | 3/2021 | |
| CN | 113771745 A | 12/2021 | |
| CN | 114132328 A | 3/2022 | |
| CN | 115363529 A | 11/2022 | |
| DE | 102013002875 A1 * | 9/2014 | ............... B60Q 1/38 |
| DE | 102017219535 A1 | 5/2019 | |
| DE | 102021105077 A1 | 9/2022 | |

* cited by examiner

SYSTEMS AND METHODS FOR SYNCHRONIZING THE PRESENTATION OF VEHICLE EXTERIOR LIGHTS

CROSS-REFERENCE TO RELATED APPLICATIONS

This application claims benefit of U.S. Non-Provisional application Ser. No. 18/526,511, filed on Dec. 1, 2023, which is herein incorporated by reference in its entirety.

TECHNICAL FIELD

The subject matter described herein relates, in general, to reducing the sensory stimulus of a pedestrian and, more particularly, to synchronizing the presentation of vehicle exterior lights to reduce the sensory stimulus of a pedestrian.

BACKGROUND

Vehicle roads and the adjacent infrastructure (e.g., sidewalks, crosswalks, etc.) are becoming increasingly complex and populated with vehicles and pedestrians. Every day, millions of pedestrians cross roads that are traveled by vehicles. This is perhaps most apparent in urban areas with significant population and vehicle densities. Given the proximity of vehicles and pedestrians in these environments, vehicle-pedestrian interactions are inevitable and a regular occurrence. Infrastructure elements may be installed in these environments to ensure the safety of vehicles and pedestrians alike. For example, crosswalks indicate locations where pedestrians may legally and safely cross a road. Traffic signals periodically stop vehicle traffic to allow pedestrians to cross a road safely, and pedestrian signals indicate to the pedestrian when they have the right-of-way to cross a road at a crosswalk.

SUMMARY

In one embodiment, example systems and methods relate to a manner of improving the pedestrian perception of a road environment.

In one embodiment, a light synchronization system for synchronizing the presentation of vehicle exterior lights to reduce the sensory overload of a pedestrian is disclosed. The light synchronization system includes one or more processors and a memory communicably coupled to the one or more processors. The memory stores instructions that, when executed by the one or more processors, cause the one or more processors to assess the sensory environment of a pedestrian. The memory also stores instructions that, when executed by the one or more processors, cause the one or more processors to determine that the pedestrian is in a sensory-overloaded state based on a characteristic of the sensory environment and sensor data indicative of a pedestrian state of mind. The memory also stores instructions that, when executed by the one or more processors, cause the one or more processors to synchronize a presentation of a first vehicle exterior light and a presentation of a second vehicle exterior light based on a determination that the pedestrian is in the sensory-overloaded state.

In one embodiment, a non-transitory computer-readable medium for synchronizing vehicle exterior lights to reduce the sensory overload of a pedestrian and including instructions that, when executed by one or more processors, cause the one or more processors to perform one or more functions is disclosed. The instructions include instructions to assess the sensory environment of a pedestrian. The instructions also include instructions to determine that the pedestrian is in a sensory-overloaded state based on a characteristic of the sensory environment and sensor data indicative of a pedestrian state of mind. The instructions also include instructions to synchronize a presentation of a first vehicle exterior light and a presentation of a second vehicle exterior light based on a determination that the pedestrian is in the sensory-overloaded state.

In one embodiment, a method for synchronizing vehicle exterior lights to reduce sensory overload of a pedestrian is disclosed. In one embodiment, the method includes assessing the sensory environment of a pedestrian. The method also includes determining that the pedestrian is in a sensory-overloaded state based on a characteristic of the sensory environment and sensor data indicative of a pedestrian state of mind. The method also includes synchronizing a presentation of a first vehicle exterior light and a presentation of a second vehicle exterior light based on a determination that the pedestrian is in the sensory-overloaded state.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
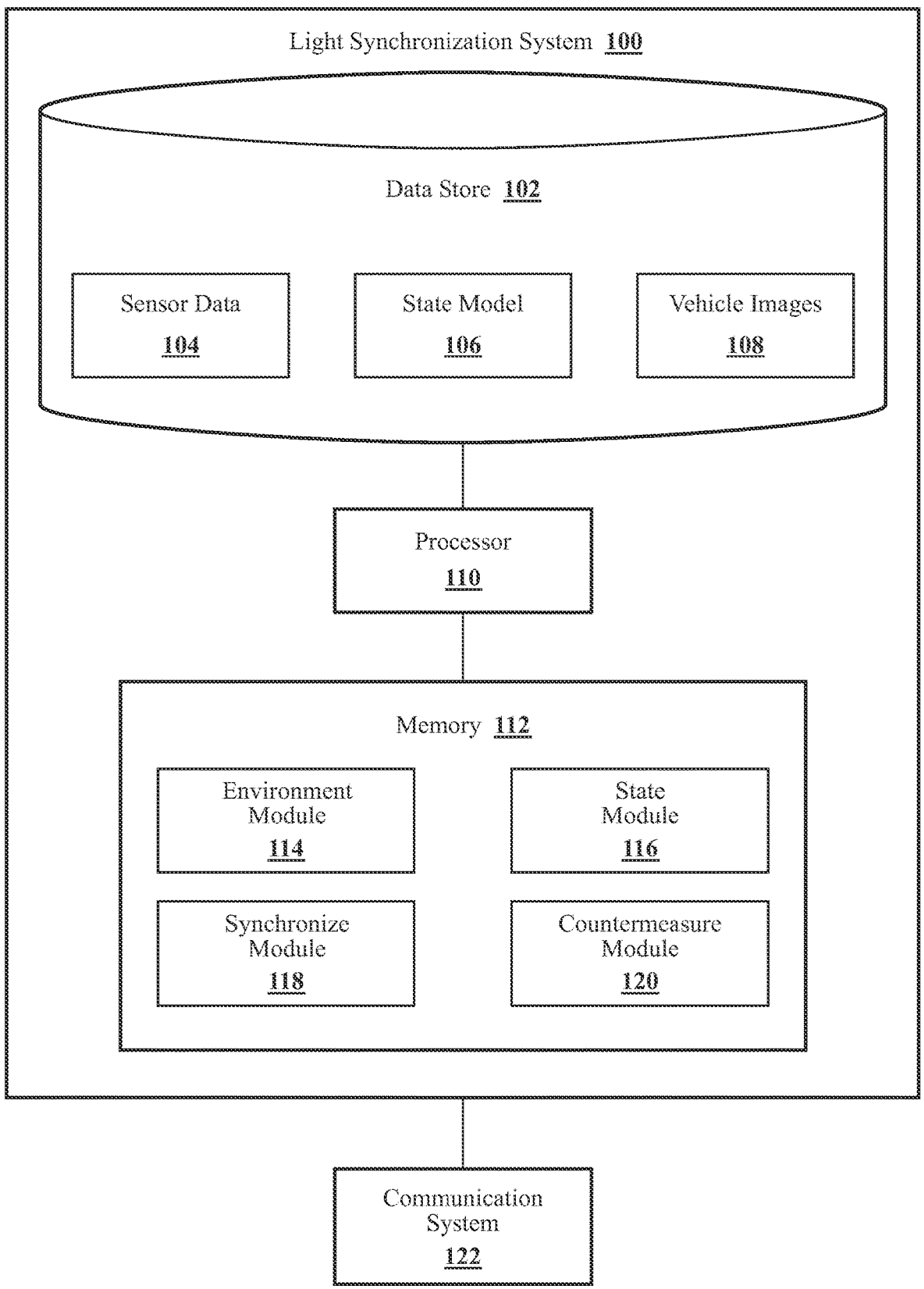
FIG. 1 illustrates one embodiment of a light synchronization system that is associated with synchronizing the presentation of vehicle exterior lights to reduce the sensory overload of a pedestrian.

Systems, methods, and other embodiments associated with improving pedestrian safety on potentially busy roads by altering the presentation of vehicle exterior lights to reduce a sensory overload of a pedestrian are disclosed herein. As previously described, roads and the adjacent infrastructure are sites of many vehicle and pedestrian interactions. Given the speeds of the vehicles and the physical differences in the size and weight of vehicles and pedestrians, such interactions have an inherent level of risk. The safe navigation of roads by vehicles and pedestrians is possible given the safety mechanisms already implemented (e.g., vehicle turn signals, traffic signs, lane markings, pedestrian crossing signals, etc.). Moreover, the likelihood of safe navigation of roads by pedestrians and motorists is increased when vehicles and pedestrians are vigilant and focused on their environment. However, some environmental conditions may negatively impact the vigilance and focus a pedestrian can give to the environment. For example, road environments, especially in urban areas, have many lights and sounds that can overload the sensory system of a pedestrian. For example, buildings, vehicles, pedestrians, and infrastructure elements produce visual and audible sensory stimuli in the sensory environment of the pedestrian. In some examples, the quantity of sensory stimuli can result in pedestrian perceptual overload.

Pedestrians with a perceptual overload may face challenges navigating roads used by vehicles. Example challenges include difficulty identifying relevant visual cues, decreased situational awareness, and slower reaction times. As such, sensory overload may make it harder for pedestrians to prioritize and react to potential hazards in their environment. For example, an elderly pedestrian may be attempting to cross a major intersection with a long row of vehicles turning left. Each vehicle may have an activated turn signal, which turn signals are of different sizes and shapes and are blinking at different rates. The asynchronous turn signals and other environmental sensory stimuli may visually overwhelm the elderly pedestrian trying to cross the road. This sensory overwhelm may impact the ability of the pedestrian to process information and proceed safely. Thus, the pedestrian may be at increased risk for accident or injury.

Accordingly, the light synchronization system of the present specification identifies when a pedestrian is experiencing sensory overload and takes action to reduce the overload by synchronizing the presentation of exterior vehicle lights. In one example, such synchronization may include altering the real-world vehicle exterior lights to blink synchronously with other real-world vehicle exterior lights. In another example, such synchronization may include overlaying synchronized computer-generated representations of vehicle exterior lights on top of real-world vehicle exterior lights as viewed through an augmented reality (AR) display device (e.g., AR glasses) worn by the pedestrian.

The light synchronization system may identify when a pedestrian is experiencing sensory overload based on 1) an assessment of the sensory environment and 2) sensor data (e.g., biometric data and images of the pedestrian) that indicate the state of mind of the pedestrian.

In an example of real-world vehicle exterior light synchronization, the light synchronization system may receive an indication from a user device (e.g., a wearable device of the pedestrian, a mobile phone, etc.) that collects biometric sensor data for the pedestrian. When the sensor data indicates that the pedestrian is sensory overloaded, the light synchronization system synchronizes the turn signals and other external lighting (e.g., headlights, taillights, light bars, etc.) of the vehicles in the vicinity of the pedestrian. Synchronization of the real-world vehicle exterior lights may include synchronizing at least one of the color, brightness, flashing state, and choreography of the vehicle exterior lights.

In another example, the light synchronization system may synchronize the presentation of the vehicle exterior lights by superimposing synchronized digital vehicle lights over the real-world vehicle lights as viewed through an AR display device worn by the pedestrian. In this example, the light synchronization system can provide an overlay where the shapes and sizes of the different vehicle exterior lights are the same.

In this way, the disclosed systems, methods, and other embodiments improve pedestrian and vehicle safety on roads and adjacent infrastructure by reducing the sensory overload of pedestrians, which may result in undesirable and potentially dangerous interactions between pedestrians and vehicles. This is done by synchronizing vehicle exterior lights, such as turn signals, to eliminate one source of sensory overload that may arise from the asynchronous blinking of turn signals of multiple vehicles on the road.

FIG. 1 illustrates one embodiment of a light synchronization system 100 that is associated with synchronizing vehicle exterior lights to reduce sensory overload of a pedestrian. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the light synchronization system 100 that is implemented to perform methods and other functions as disclosed herein relates to improving the sensory perception of a pedestrian by synchronizing the presentation of vehicle exterior lights, whether such synchronization is of the real-world vehicle lights or a digital overlay presentation of synchronized lights over the real-world vehicle lights viewed through an AR display system.

As will be discussed in greater detail subsequently, the light synchronization system 100, in various embodiments, may be implemented as a cloud-based service. For example, in one approach, functionality associated with at least one module of the light synchronization system 100 is implemented within a cloud-based computing system, while further functionality is implemented with one or more of a vehicle or an AR display device worn by the pedestrian. In other examples, the light synchronization system 100 may be entirely disposed on a computing system remote from the environment where the pedestrian is found. In this example, sensor data 104 stored at the remote server is received from user devices of the pedestrian and/or vehicles and infrastructure elements in the vicinity of the pedestrian.

Moreover, the light synchronization system 100 functions in cooperation with a communication system 122. In one embodiment, the communication system 122 communicates according to one or more communication standards. For example, the communication system 122 can include multiple different antennas/transceivers and/or other hardware elements for communicating at different frequencies and according to respective protocols. The communication system 122, in one arrangement, communicates via a communication protocol, such as a WiFi, dedicated short-range communication (DSRC), vehicle-to-infrastructure (V2I), vehicle-to-vehicle (V2V), or vehicle-to-pedestrian (V2P) or another suitable protocol for communicating between the entities in the cloud environment. Moreover, the communication system 122, in one arrangement, further communicates according to a protocol, such as global system for mobile communication (GSM), Enhanced Data Rates for GSM Evolution (EDGE), Long-Term Evolution (LTE), 5G, or another communication technology that provides for the entities in the cloud-based environment to communicate with various remote devices (e.g., a cloud-based server). In any case, the light synchronization system 100 can leverage various wireless communication technologies to provide communications to other entities, such as members of the cloud-computing environment.

The light synchronization system 100 is shown as including a processor 110. In one or more arrangements, the processor(s) 110 can be a primary/centralized processor of the light synchronization system 100 or may be representative of many distributed processing units. For instance, the processor(s) 110 can be an electronic control unit (ECU). Alternatively, or additionally, the processor(s) 110 may include a central processing unit (CPU), an application-specific integrated circuit (ASIC), a microcontroller, a system on a chip (SoC), and/or other electronic processing unit. As will be discussed in greater detail subsequently, the light synchronization system 100, in various embodiments, may be implemented as a cloud-based service.

In one embodiment, the light synchronization system 100 includes a memory 112 that stores an environment module 114, a state module 116, a synchronize module 118, and a countermeasure module 120. The memory 112 is a random-access memory (RAM), read-only memory (ROM), a hard-disk drive, a flash memory, or another suitable memory for storing the modules 114, 116, 118, and 120. In alternative arrangements, the modules 114, 116, 118, and 120 are independent elements from the memory 112 that are, for example, comprised of hardware elements. Thus, the modules 114, 116, 118, and 120 are alternatively ASICs, hardware-based controllers, a composition of logic gates, or another hardware-based solution.

In at least one arrangement, the modules 114, 116, 118, and 120 are implemented as non-transitory computer-readable instructions that, when executed by the processor 110, implement one or more of the various functions described herein. In various arrangements, one or more of the modules 114, 116, 118, and 120 are a component of the processor(s) 110, or one or more of the modules 114, 116, 118, and 120 are administered on and/or distributed among other processing systems to which the processor(s) 110 is operatively connected.

Alternatively, or in addition, the one or more modules 114, 116, 118, and 120 are implemented, at least partially, within hardware. For example, the one or more modules 114, 116, 118, and 120 may be comprised of a combination of logic gates (e.g., metal-oxide-semiconductor field-effect transistors (MOSFETs)) arranged to achieve the described functions, an ASIC, programmable logic array (PLA), field-programmable gate array (FPGA), and/or another electronic hardware-based implementation to implement the described functions. Further, in one or more arrangements, one or more of the modules 114, 116, 118, and 120 can be distributed among a plurality of the modules 114, 116, 118, and 120 described herein. In one or more arrangements, two or more of the modules 114, 116, 118, and 120 described herein can be combined into a single module.

In one embodiment, the light synchronization system 100 includes a data store 102. The data store 102 is, in one embodiment, an electronic data structure stored in the memory 112 or another data storage device and that is configured with routines that can be executed by the processor 110 for analyzing stored data, providing stored data, organizing stored data, and so on. Thus, in one embodiment, the data store 102 stores data used by the modules 114, 116, 118, and 120 in executing various functions.

The data store 102 can be comprised of volatile and/or non-volatile memory. Examples of memory that may form the data store 102 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 102 is a component of the processor(s) 110. In general, the data store 102 is operatively connected to the processor(s) 110 for use thereby. The term "operatively connected," as used throughout this description, can include direct or indirect connections, including connections without direct physical contact.

In an example, the data store 102 includes sensor data 104. In general, sensor data 104 may be data that indicates the sensory state of the pedestrian. That is, any number of observable or measurable traits may characterize a pedestrian who is experiencing sensory overload. The state module 116 relies on this sensor data 104 to classify the pedestrian as in a sensory-overloaded state.

The sensor data 104 may take a variety of forms. For example, the sensor data 104 may be biometric data collected from biometric sensors. Biometric data may indicate the sensory state of the pedestrian. For example, the heart rate of a sensory-overloaded pedestrian may be elevated. Similarly, the galvanic skin response (GSR) of a sensory-overloaded pedestrian may be elevated. As such, the sensor data 104 may include these and other types of biometric data for the pedestrian from which the sensory state of the pedestrian may be determined. Examples of biometric data that may be included in the sensor data 104 include, but are not limited to, heart rate, GSR, brain electrical activity data (as measured by an electroencephalogram (EEG)), and near-infrared spectroscopy (NIRS) data. While particular reference is made to particular biometric data collected for the pedestrian, the sensor data 104 may include other forms of biometric data. In an example, the biometric data may be collected from a variety of devices such as a mobile health monitoring device (e.g., smartwatch) worn by the pedestrian or a user device (e.g., smartphone) executing a health monitoring app.

In an example, the sensor data 104 may include images of the pedestrian as captured by a camera or other perceptual sensor output (as captured by a LiDAR sensor, a radar sensor, or a sonar sensor, among others). That is, the movement of the pedestrian may also indicate the sensory state of the pedestrian. For example, a sensory-overloaded pedestrian may try to block out some visual stimuli by shading their eyes with their hand, squinting their eyes, or turning away from the visual stimuli. As such, the images or other output may capture the facial traits/movements, eye traits/movements, appendage traits/movements, gait, and other physical movements that may indicate pedestrian sensory overload.

The captured images may also indicate other objects in the environment of the pedestrian. In some examples, the pedestrian may be exhibiting behaviors not caused by sensory overload. For example, a pedestrian may have an increased heart rate, not resulting from sensory overload but as the result of a medical condition. In this case, synchronization of the presentation of vehicle exterior lights may not positively affect the sensory state of the pedestrian. As such, the environment module 114 may evaluate the sensory environment by analyzing the objects in the image to determine if the behavior of the pedestrian is attributed to the sensory stimulus of the environment or to some other cause.

In an example, the images or other environment sensor outputs are collected from several devices in the vicinity of the pedestrian. For example, any of the nearby vehicles, nearby infrastructure elements, and the user device of the pedestrian may include a camera that may capture images of the pedestrian such that the movement of the face and/or body of the pedestrian may be tracked.

In an example, the sensor data 104 may include historical biometric data and/or pedestrian images. That is, in some examples a determination regarding whether the pedestrian is sensory overloaded may be based, at least in part, on a deviation of current traits/behavior from expected traits/behavior. For example, as described above, an elevated heart rate may indicate that a pedestrian is visually overloaded. In this example, whether or not a current heart rate is elevated is based on baseline heart rate data for the pedestrian.

The sensor data 104 may include similar data for other individuals. For example, elevated heart rate may also be determined by comparing the currently measured heart rate for the pedestrian to an expected heart rate as determined by pedestrians with similar vitals (e.g., age, size, weight, etc.). As such, the sensor data 104 includes a history of biometric data or images/sensor output for the pedestrian and potentially different pedestrians to form baseline data against which currently compiled sensor data 104 may be compared. The state module 116 may rely on this comparison to classify the sensory state of the pedestrian. In these examples, the light synchronization system 100 may establish a wireless connection via the communication system 122 with the device from which the biometric data and images are collected.

In one embodiment, the data store 102 stores the sensor data 104 along with, for example, metadata that characterizes various aspects of the sensor data 104. For example, the metadata can include location coordinates (e.g., longitude and latitude), relative map coordinates or tile identifiers, time/date stamps from when the separate data was generated, and so on. As a particular example, the metadata may include identifying information about the pedestrian to which it is associated. For example, metadata associated with the biometric data and images may include identifying information about the pedestrian, such as a unique identifier or location information. As a specific example, the sensor data 104 may include captured images of an unidentified pedestrian who is determined to be experiencing sensory overload. Metadata associated with this sensor data 104 may indicate a location, either coordinate-based or from the perspective of the vehicle, of the pedestrian. Metadata associated with the biometric data may also include location information for the pedestrian, such that the images of the unidentified pedestrian may be associated with the pedestrian via matching location information of the biometric data and the images. While one example is presented herein for linking data collected from disparate systems (e.g., a vehicle and biometric sensor for the pedestrian), other systems may be implemented to associate the sensor data with the pedestrian. As another example, the pedestrian captured in an image captured by a vehicle camera may be identified via facial recognition and linked to biometric sensor data via a pedestrian profile. In any case, as a result of the linking, the sensor data 104, in one embodiment, represents a combination of perceptions of a pedestrian acquired from multiple sensors.

The data store 102 further includes a state model 106, which may be relied on by the state module 116 to classify the sensory overload of the pedestrian. In an example, the light synchronization system 100 may be a machine-learning system that identifies patterns and/or deviations based on previously unseen data. In the context of the present application, a machine-learning light synchronization system 100 relies on some form of machine learning, whether supervised, unsupervised, reinforcement, or any other type, to infer whether the pedestrian is experiencing sensory overload based on the observed characteristics of the pedestrian (i.e., biometric data and/or images of the pedestrian) and the observed environmental characteristics.

In any case, the state model 106 includes the weights (including trainable and non-trainable), biases, variables, offset values, algorithms, parameters, and other elements that operate to output a likely sensory state of the pedestrian based on any number of input values including sensor data 104 and environment data.

In an example, the data store 102 further includes vehicle images 108. As described above and in greater detail below, synchronizing the presentation of vehicle exterior lights may include overlaying digital vehicle images 108 of a vehicle on top of a real-world vehicle as viewed through an AR display device. As such, the data store 102 may include vehicle images 108 that are digital versions of real-world vehicles. This overlay may block out the asynchronous real-world vehicle exterior lights, allowing synchronously choreographed digital vehicle exterior lights to be superimposed.

The vehicle images 108 may include 360-degree images of the vehicles or images that collectively capture the vehicles in 360 degrees such that regardless of where the pedestrian is standing, an overlay that aligns with the current perspective of the real-world vehicle through the AR display device may be superimposed on top of the real-world vehicle. The vehicle images 108 may include images of various makes and models of vehicles and different years and colors of the vehicle. Accordingly, the light synchronization system 100 may include a library of digital overlays of any of the vehicles a pedestrian may encounter on the road regardless of the make, model, year, and color of the vehicle.

The light synchronization system 100 includes an environment module 114 which, in one embodiment, includes instructions that cause the processor 110 to assess a sensory environment of a pedestrian. As described above, it may be the case that the sensory environment is not a cause of the compromised state of mind of the pedestrian. In such a case, synchronizing vehicle exterior lights may not alleviate the condition of the pedestrian and may, therefore, represent a waste of resources. As such, the environment module 114 evaluates the sensor data 104, and more particularly the images of the environment captured by the infrastructure or vehicle environment sensors, to determine whether the sensory environment is potentially the cause of the state of mind of the pedestrian.

There are many elements of a sensory environment that could potentially overwhelm a pedestrian. Examples include the number of lights (e.g., vehicle exterior lights and others) in the environment, the brightness of the lights, the intensity of the lights, the contrast between the lights and ambient light, the flashing frequency of lights, the color of the lights, the density of lights in the environment, and others. For example, many building lights in an urban center with many vehicles at night may be more likely to overstimulate a pedestrian as compared to a few traffic signs in a rural neighborhood during the day. As such, the environment module 114 may include an image processor that extracts from the images an identification of various vehicle and environment light sources and the quality and nature of the emanated light from each source. The environment module 114 may then evaluate the sensory environment in any number of ways. For example, the environment module 114 may assign the sensory environment a score based on an assessment of the above-noted criteria. If the score is greater than a threshold, the environment module 114 may deem the sensory environment as one that could lead to sensory overload for the pedestrian. In an example, the threshold may be set by a user based on personal preference or may be set by a system administrator or engineer based on medical standards.

The light synchronization system 100 further includes a state module 116 which, in one embodiment, includes instructions that cause the processor 110 to determine that the pedestrian is in a sensory-overloaded state based on a characteristic of the sensory environment and sensor data 104 indicative of a pedestrian state of mind. That is, as described above, certain traits/behaviors of a pedestrian may indicate that the pedestrian is sensory overloaded. When a potentially overwhelming sensory environment causes these behaviors, the light synchronization system 100 may take certain remedial measures to prevent a potentially dangerous situation.

As described above, certain biometric traits, such as an elevated heart rate, an elevated GSR, increased brain activity, and others, may indicate that the pedestrian is sensory overloaded when combined with a determined overstimulating environment. As such, the state module 116 extracts biometric data for the pedestrian to evaluate the sensory overloaded state of the pedestrian.

Similarly, some physical behaviors of the pedestrian may indicate that the pedestrian is sensory overloaded when combined with the determined overstimulating environment. For example, an overstimulated pedestrian may raise their hand to block visual stimuli, squint their eyes, or turn away from the visual stimuli. As another example, a pedestrian who is motionless at an intersection for multiple traffic light cycles may be sensory overloaded.

As such, the state module 116 may include an image processor that can detect pedestrians in images captured by infrastructure, vehicle, or user devices and track the traits/movement of the pedestrian and the different body parts of the pedestrian, such as their face, eyes, arms, and legs. As such, the state module 116 includes instructions that cause the processor 110 to assess at least one of the biometric data for the pedestrian or images of the pedestrian to determine that the pedestrian is in the sensory-overloaded state.

Note that in some examples, the state module 116 relies on various sensor data when generating an output. That is, it may be that a single movement or biometric characteristic of the pedestrian is insufficient to generate a classification with a threshold level of confidence. As such, the state module 116, relying on the state model 106, may weigh the different sensor data 104 and environment data to generate a classification with the threshold level of confidence.

In an example, the classifications depend on a deviation of measured sensor data 104 from baseline sensor data, which baseline sensor data may pertain to either the pedestrian or different pedestrians such as a regional or broad public. The baseline sensor data may take various forms and generally reflects the historical patterns of those for whom it is collected. As specific examples, baseline sensor data may include historical biometric data such as heart rate, galvanic skin response, brain activity, and historic movement patterns.

The baseline sensor data may be classified based on metadata associating the baseline sensor data with the sensory overloaded state of the individuals for whom it is collected. Put another way, the baseline sensor data may include baseline sensor data for the pedestrian and other users when not overstimulated and baseline sensor data for the pedestrian and other users when overstimulated in the sensory environment. That is, the pedestrian and other individuals may exhibit certain patterns when experiencing sensory overload and other patterns when not overstimulated. The state module 116 may identify these patterns in historical baseline sensor data and compare them to currently measured sensor data 104 for pedestrians to identify deviations between them.

That is, the state module 116 includes instructions that cause the processor 110 to compare the sensor data 104 with baseline sensor data where the baseline sensor data indicates 1) a behavior or biometric pattern for the pedestrian and/or 2) a behavior or biometric pattern of a different pedestrian. By comparing current sensor data 104 against baseline sensor data and considering the output of the environment module 114, the state module 116 can infer the sensory state of the pedestrian. In other words, the state module 116, which may be a machine-learning module, identifies patterns in the expected behavior of the pedestrian and/or other users and determines when the current behavior/biometric data deviates or aligns with those patterns. Those deviations and the characteristics of the deviation (e.g., number of deviations, frequency of deviations, degree of deviations) are relied on in determining whether the pedestrian is likely to be experiencing sensory overload.

Specifically, the state module 116 may include instructions that cause the processor 110 to classify the pedestrian state of mind based on at least one of 1) a degree of deviation between the sensor data 104 and the baseline sensor data and/or 2) a number of deviations between the sensor data 104 and the baseline sensor data within a period. That is, certain deviations from an expected behavior (as indicated by the baseline sensor data) may not indicate sensory overload but may be attributed to natural variation or another cause. Accordingly, the state module 116 may include a deviation threshold against which the deviations are compared to classify the pedestrian sensory state. Specifically, the state module 116 may be a machine-learning module that considers the quantity and quantity of deviations over time to infer sensory overload.

Figure 7:
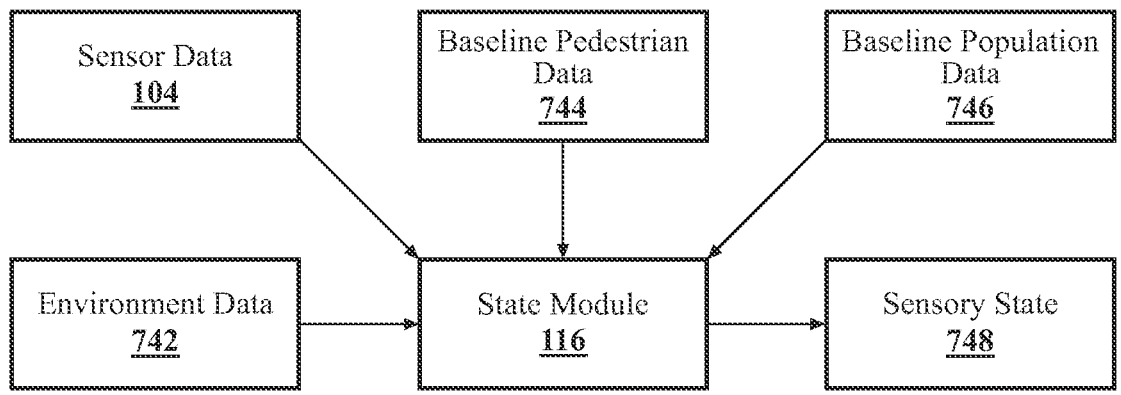
FIG. 7 illustrates one embodiment of a machine-learning light synchronization system associated with synchronizing vehicle exterior lights to reduce the sensory overload of a pedestrian.

In one approach, the state module 116 implements and/or otherwise uses a machine learning algorithm. A machine-learning algorithm generally identifies patterns and deviations based on previously unseen data. In the context of the present application, a machine-learning state module 116 relies on some form of machine learning, whether supervised, unsupervised, reinforcement, or any other type of machine learning, to identify patterns in pedestrian and other individual's expected behavior and infers whether the pedestrian is experiencing sensory overload based on 1) the currently collected sensor data 104, 2) a comparison of the currently collected sensor data 104 to historical patterns for the pedestrian and/or other pedestrians, and 3) an output of the environment module 114. As such, as depicted in FIG. 7, the inputs to the state module 116 include the sensor data 104 and the environment data, as well as baseline sensor data for the pedestrian and other pedestrians. The state module 116 relies on a mapping between behavior patterns and sensory overload, determined from the training set, which includes baseline sensor data, to determine the likelihood of sensory overload of the pedestrian based on the monitored behaviors and biometric data of that pedestrian.

In one configuration, the machine learning algorithm is embedded within the state module 116, such as a convolutional neural network (CNN) or an artificial neural network (ANN) to perform sensory overload classification over the sensor data 104 and output of the environment module 114 from which further information is derived. Of course, in further aspects, the state module 116 may employ different machine learning algorithms or implement different approaches for performing the sensory overload classification, which can include logistic regression, a naïve Bayes algorithm, a decision tree, a linear regression algorithm, a k-nearest neighbor algorithm, a random forest algorithm, a boosting algorithm, and a hierarchical clustering algorithm among others to generate sensory overload classifications. Other examples of machine learning algorithms include but are not limited to deep neural networks (DNN), including transformer networks, convolutional neural networks, recurrent neural networks (RNN), Support Vector Machines (SVM), clustering algorithms, Hidden Markov Models, and so on. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the light synchronization system 100 or another system generally trains the machine learning algorithm according to a particular training approach, which may include supervised training, self-supervised training, reinforcement learning, and so on. In contrast to training/learning of the machine learning algorithm, the light synchronization system 100 implements the machine learning algorithm to perform inference. Thus, the general use of the machine learning algorithm is described as inference.

It should be appreciated that the state module 116, in combination with the state model 106, can form a computational model such as a neural network model. In any case, the state module 116, when implemented with a neural network model or another model in one embodiment, implements functional aspects of the state model 106 while further aspects, such as learned weights, may be stored within the data store 102. Accordingly, the state model 106 is generally integrated with the state module 116 as a cohesive, functional structure. Additional details regarding the machine-learning operation of state module 116 and state model 106 are provided below in connection with FIG. 7.

As such, the state module 116, in some examples relying on machine learning, receives as input the sensor data 104 and an output of the environment module 114 and outputs a likelihood of whether the pedestrian is sensory overloaded. For example, when the sensor data 104 indicates the pedestrian is executing those movements indicative of sensory overload, the state module 116 may identify the pedestrian as in a sensory overloaded state. Given the relationships between 1) behaviors/traits of the pedestrian and sensory overload and 2) the sensory overload of the pedestrian and pedestrian safety, the state module 116 increases the likelihood of safe navigation of busy roads and adjacent infrastructure by reducing the sensory stimulus of the pedestrian by synchronizing the presentation of external vehicle lights.

The light synchronization system 100 further includes a synchronize module 118 which, in one embodiment, includes instructions that cause the processor 110 to synchronize a presentation of a first vehicle exterior light and a presentation of a second vehicle exterior light based on a determination that the pedestrian is in the sensory overloaded state. As described above, sensory overload may impede the ability of a pedestrian to correctly perceive and act within a particular environment. As such, the synchronize module 118 may reduce the sensory overload by removing one cause of sensory overload, the asynchronous blinking of vehicle exterior lights.

Figure 3:
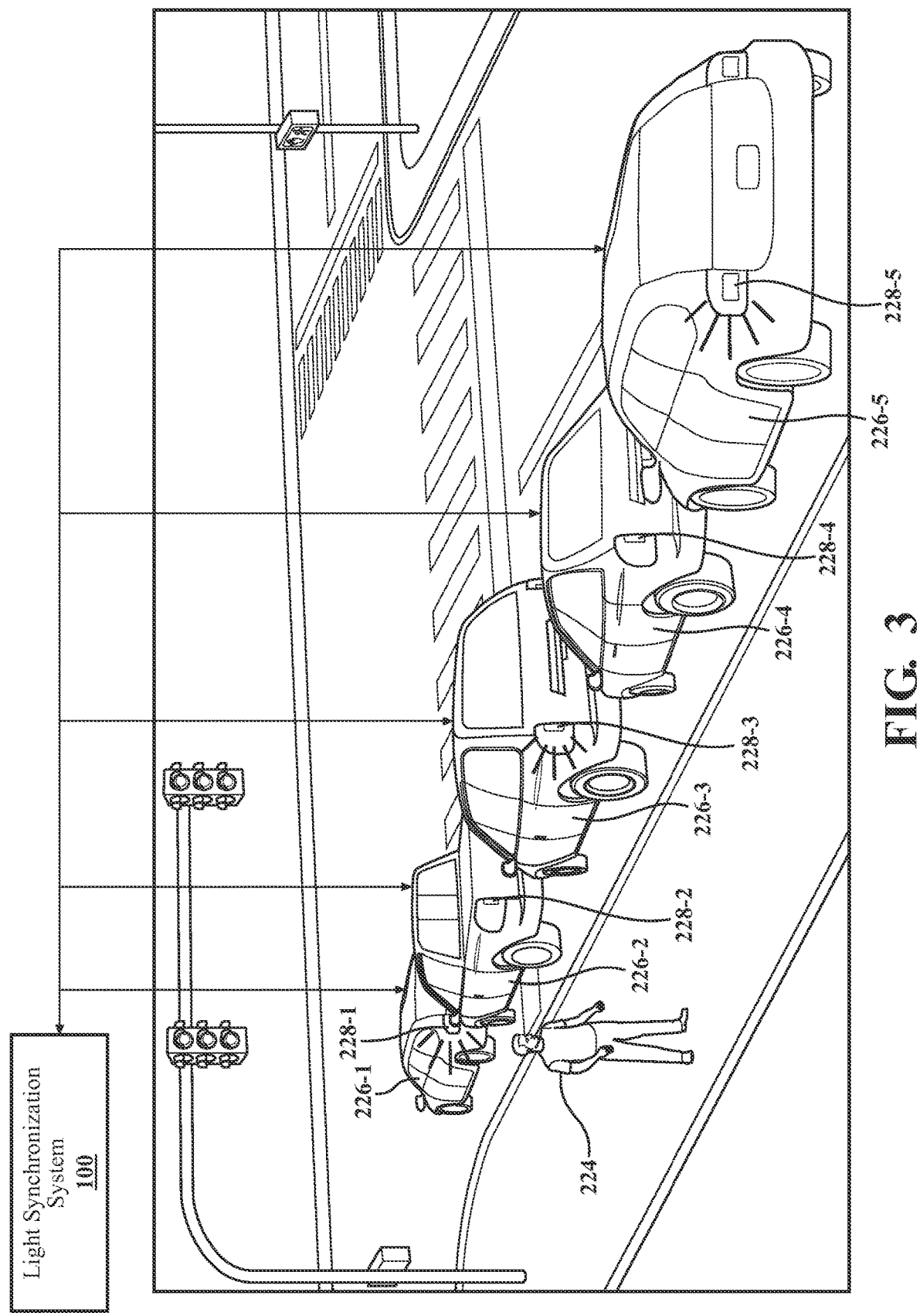
FIG. 3 illustrates an environment with asynchronous vehicle exterior lights.

In one example, synchronization of the presentation of vehicle exterior lights includes the alteration of real-world vehicle exterior lights. For example, as depicted in FIG. 3, multiple vehicles may be in line to turn left. In this example, the synchronize module 118 transmits a command signal to the vehicles, the command signal coordinates the flashing of the turn signals to be synchronous with one another. Additional details regarding the real-world synchronization of vehicle exterior lights are provided below in connection with FIGS. 3 and 4.

In another example, the presentation that is synchronized is digital instead of real-world. That is, the synchronize module 118 may present synchronized digital representations of the vehicle exterior lights over real-world vehicle exterior lights as viewed through an AR display device. An example of a digital overlay of synchronized vehicle exterior lights is provided below in connection with FIGS. 5-6B.

In some examples, the light synchronization system 100 further includes a countermeasure module 120 which, in one embodiment, includes instructions that cause the processor 110 to produce a countermeasure responsive to a pedestrian identified as being in a sensory overloaded state. The countermeasure module 120 may be communicatively coupled to the state module 116 to receive a sensory overload classification.

That is, in addition to synchronizing the presentation of the vehicle exterior lights, the countermeasure module 120 may generate a notification for other entities near the pedestrian. For example, the countermeasure module 120 may generate a notification to a human vehicle operator, an autonomous vehicle system, or an infrastructure element in the vicinity of the pedestrian. These notifications may notify of the presence of the sensory overloaded pedestrian so specific remedial actions can be administered to protect the pedestrian and others in the vicinity of the pedestrian.

As described above, the countermeasure may be a command signal transmitted to a vehicle in the vicinity of the pedestrian, which command signal changes the operation of the vehicle responsive to an identified pedestrian with sensory overload. Examples of operational changes triggered by the command signal include, but are not limited to 1) decreasing the vehicle speed in a vicinity of the pedestrian, 2) increasing a volume of vehicle horns, 3) modifying a braking profile of an automated vehicle to be softer (i.e., brake sooner and more slowly), 4) modifying an acceleration profile of an automated vehicle to be softer (i.e., accelerate more slowly and over a longer distance), 5) allowing for extra space between the vehicle and the pedestrian, 6) rerouting the vehicle to avoid being in the vicinity of the pedestrian, 7) increasing a clearance sonar sensitivity in the presence of the pedestrian, 8) turning off lane departure alerts in the vicinity of the pedestrian, 9) increasing adaptive cruise control distance setting to allow for more space between vehicles, 10) flashing lights at a pedestrian to catch the attention of the pedestrian to alter their state or encourage certain behavior (e.g., crossing a street), 11) turning down music in the cabin, 12) applying external one-way blackout to windows to prevent the pedestrian from seeing inside the vehicle thus simplifying the visual load on the pedestrian, 13) turning off non-safety related lights and or sounds to reduce the sensory load of the pedestrian, 14) rolling up windows to block out vehicle cabin noise from further distracting/stressing the pedestrian, and 15) increasing a frequency of audible alerts or increase conspicuity of signals to increase chance of pedestrian perception.

Moreover, as described above, the countermeasure may be a command signal transmitted to an infrastructure element, such as a traffic light. Examples of operational changes triggered by the command signal include 1) repeating alerts or increasing the conspicuity of signals to increase the chance of pedestrian perception, 2) altering signals to reroute traffic away from the pedestrian, 3) allowing extra time for the pedestrian to cross at signaled intersections, and 4) turning off traffic signals when no vehicles exist within a defined proximity. While particular reference is made to particular countermeasures, various countermeasures may be implemented to reduce or preclude the events that may arise due to a pedestrian's overloaded sensory state.

As such, the present light synchronization system 100 identifies those pedestrians experiencing sensory overload and takes remedial measures to avoid the negative situations that may arise were such pedestrians allowed to remain sensory overloaded. Specifically, the real-world vehicle lights may be synchronized, or an AR representation may block out the asynchronous lights and superimpose synchronized lights on top of the asynchronous lights.

Figure 2:
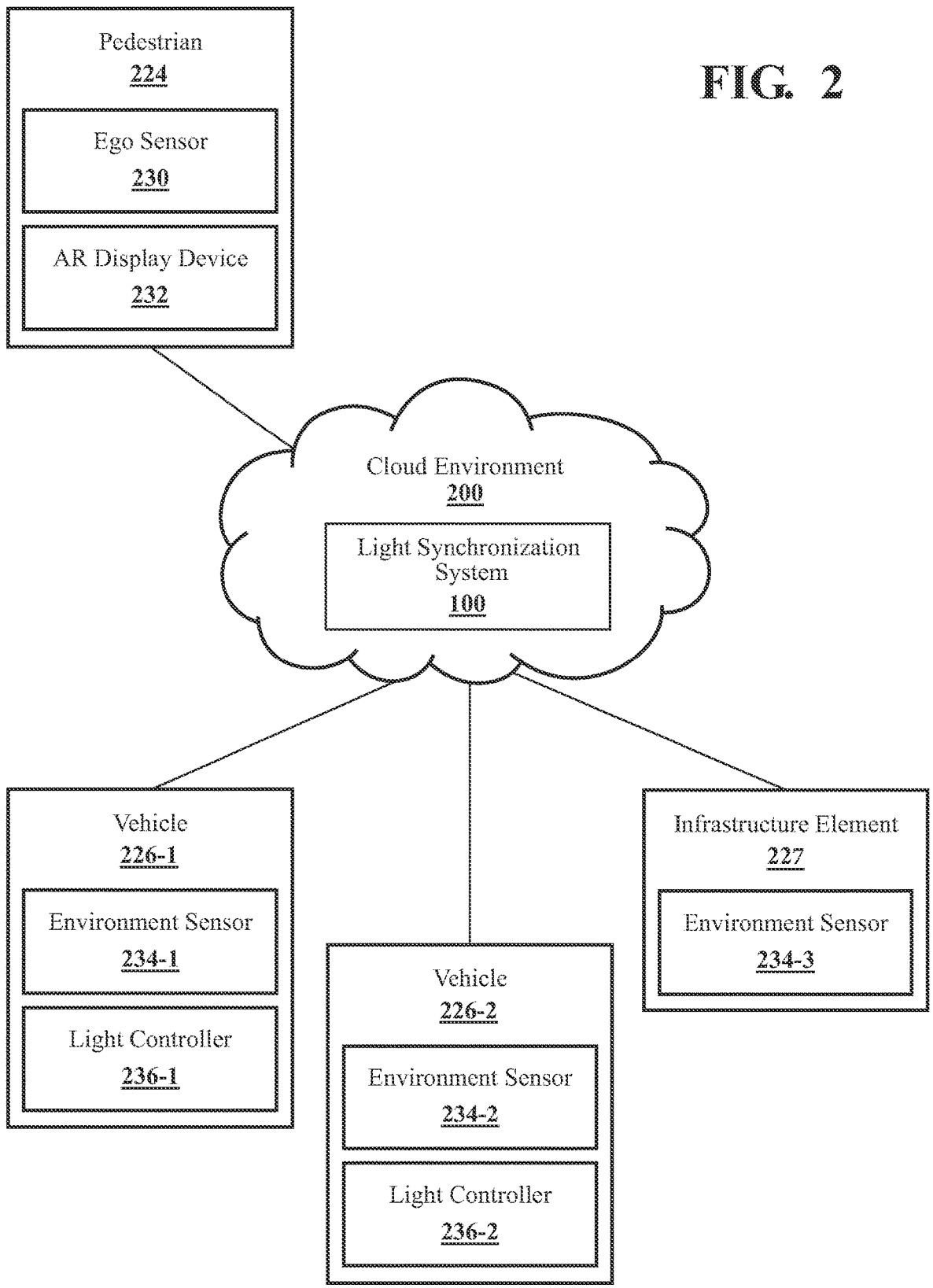
FIG. 2 illustrates one embodiment of the light synchronization system of FIG. 1 in a cloud-computing environment.

FIG. 2 illustrates one embodiment of the light synchronization system 100 of FIG. 1 in a cloud-computing environment 200. That is, as illustrated in FIG. 2, the light synchronization system 100 may be embodied at least in part within the cloud-computing environment 200. In one or more approaches, the cloud computing environment 200 may facilitate communications between devices of a pedestrian 224, vehicles 226-1 and 226-2, and an infrastructure element 227 to acquire and distribute information. Specifically, in various embodiments, the light synchronization system 100 communicates with other vehicles/infrastructure elements through a cloud-based service.

Accordingly, as shown, the light synchronization system 100 may include separate instances within one or more entities of the cloud-computing environment 200, such as servers, and also instances within vehicles that function cooperatively to acquire, analyze, and distribute the noted information. In a further aspect, the entities that implement the light synchronization system 100 within the cloud-computing environment 200 may vary beyond transportation-related devices and encompass mobile devices (e.g., smartphones), and other devices that may be carried by a pedestrian. Thus, the set of entities that function in coordination with the cloud-computing environment 200 may be varied.

The cloud-computing environment 200 may be a dynamic environment comprising cloud members routinely migrating into and out of a geographic area. As it relates to this particular system, network membership may change based on the movement of the vehicles and pedestrians. That is, as vehicles, infrastructure elements, and pedestrians come within a threshold distance of one another, a communication path, such as a V2P, V2V, V2I, or vehicle-to-everything (V2X) communication path, may be established between the light synchronization system 100 and sensors of a pedestrian 224, vehicles 226-1 and 226-2, and an infrastructure element 227.

In any event, via this network and the communication system 122 link between the light synchronization system 100 and the entities of the cloud-based environment, the light synchronization system 100 can communicate with various sensors/entities to receive/transmit information to 1) identify those pedestrians that may be experiencing sensory overload and 2) synchronize vehicle exterior lights of those vehicles in the vicinity of the pedestrian to reduce the sensory load on the pedestrian.

For example, the vehicles 226-1 and 226-2 and the infrastructure element 227 may include one or more environment sensors 234-1, 234-2, and 234-3 that sense a surrounding environment (e.g., external) of the vehicles 226-1 and 226-2 and infrastructure element 227, respectively. For example, the one or more environment sensors 234 sense objects, such as pedestrians and visual stimuli sources in the surrounding environment of the vehicles 226 and infrastructure element 227. As an example, in one or more arrangements, the environment sensors 234 may include one or more radar sensors, one or more LiDAR sensors, one or more sonar sensors (e.g., ultrasonic sensors), and/or one or more cameras (e.g., monocular, stereoscopic, RGB, infrared, etc.). As described above, physiological indicators such as gait, eye movement, facial movement, and pupil dilation, among others, may be captured by the environment sensor 234 for processing by the state module 116.

In an example, the pedestrian 224 may be carrying or adorned with an ego sensor 230. An ego sensor 230 may refer to any sensor that senses biometric data of the pedestrian 224 or that otherwise senses a characteristic of the pedestrian 224. For example, the ego sensor 230 may be a wearable device that determines the heart rate, the GSR, or the brain activity of a pedestrian. While particular reference is made to particular biometric sensors, the ego sensor 230 may be any sensor that collects biometric information from the user.

In an example, the ego sensor 230 may be similar to an environment sensor wherein images or other perception sensor output of the pedestrian is captured. For example, the ego sensor 230 may include a user device camera that captures pedestrian images. In any case, the ego sensor 230 is a sensor that captures information directly about the pedestrian, whether such information is biometric information or information (e.g., images) from a perception sensor such as a camera. In any case, the light synchronization system 100 includes instructions that function to control the processor 110 to receive data inputs from one or more sensors of the vehicle(s) 226, the infrastructure element(s) 227, and the ego sensor(s) 230 of the pedestrian 224.

Moreover, via the communication system 122, the light synchronization system 100, and more specifically, the synchronize module 118 and countermeasure module 120, may transmit notifications, messages, alerts, and/or command signals to the AR display device 232, vehicles 226, and/or infrastructure element 227.

In a particular example where the presentation of the synchronized lights is via control of the real-world vehicle exterior lights, the synchronize module 118 may send a control signal to the light controllers 236-1 and 236-2 of the respective vehicles 226-1 and 226-2, which control signal dictates a lighting mode (e.g., solid or flashing), a flashing rate, and/or a flashing color for the vehicle exterior lights, and in particular for vehicle turn signals which otherwise may asynchronously flash. In an example, the light synchronization system 100 may send a similar command signal to multiple vehicles in an environment, such as multiple vehicles that are in a line, so that the exterior lights of all vehicles 226 in the line are synchronized.

In a particular example where synchronized lights are presented via a digital overlay of synchronized exterior lights on top of real-world asynchronous exterior lights, the light synchronization system 100 may target an AR display device 232 of a sensory-overloaded pedestrian 224. In an example, the signal transmitted to generate the digital overlay may instruct a processor of the AR display device 232 to generate the overlay as described below in connection with FIGS. 5-6B. In an example, the synchronize module 118 may directly transmit the overlay to the AR display device 232. In this example, the AR display device 232 may unpackage the overlay and generate such on the lens of the AR display device 232 as described below in connection with FIGS. 5-6B.

In either case, the synchronize module 116 may identify a target of the command signal or a target vehicle that is to receive a superimposed digital overlay based on the current state of the vehicle exterior lights (e.g., flashing), the position of the vehicle 226, and/or the status of the vehicle 226 as a source of sensor data from which a sensory overloaded pedestrian was identified. For example, via metadata associated with the sensor data 104 or otherwise transmitted to the light synchronization system 100 via the cloud-based environment 200, the light synchronization system 100 may identify the location of the vehicles 226 and determine whether such are in the vicinity of a pedestrian that is experiencing sensory overload. The environment module 114 may identify those vehicles with blinking lights via this metadata or pixel analysis of captured images. If vehicles near pedestrians have blinking external lights, the synchronize module 118 may transmit a control signal to these vehicles 226.

FIG. 3 illustrates an environment with asynchronous vehicle exterior lights. Specifically, FIG. 3 depicts multiple vehicles 226-1, 226-2, 226-3, 226-4, and 226-5 attempting to turn left and appropriately indicating such with their turn signals 228-1, 228-2, 228-3, 228-4, and 228-5. However, as described above, the multiple asynchronous flashing lights of these turn signals 228 may lead to sensory overload of a pedestrian 224. The sensory overload may also be in part due to non-vehicle sources of light such as building lights, traffic signals, etc. Regardless of the cause, the light synchronization system 100 of the present specification alleviates some sensory overload by synchronizing the otherwise asynchronous exterior lights.

Figure 4:
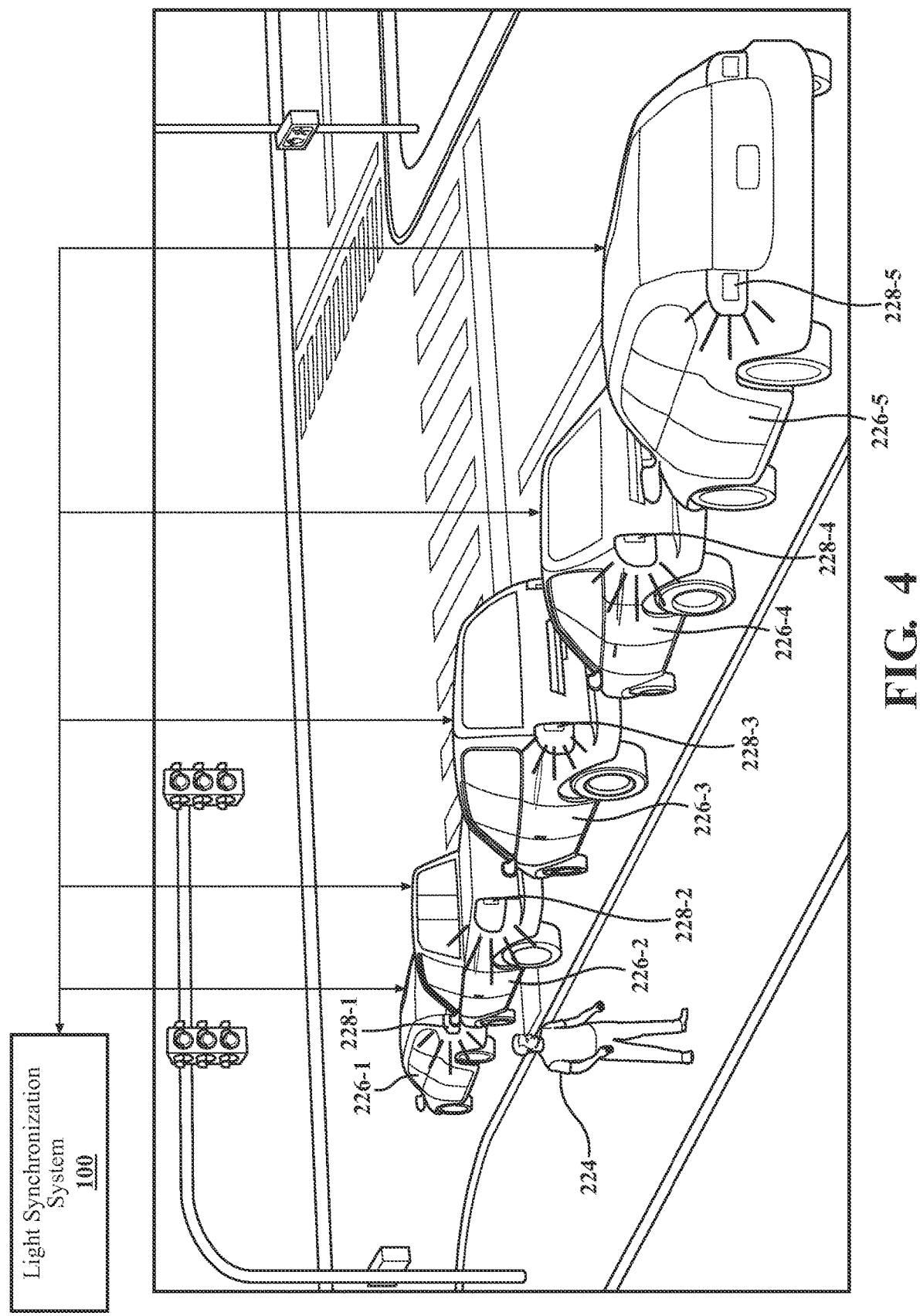
FIG. 4 illustrates one embodiment of a light synchronization system that synchronizes vehicle exterior lights to reduce the sensory overload of a pedestrian.

FIG. 4 illustrates one embodiment of a light synchronization system 100 that synchronizes vehicle exterior lights to reduce sensory overload of a pedestrian 224. In this example, the light synchronization system 100 establishes a communication path with the different vehicles 226-1, 226-2, 226-3, 226-4, and 226-5 such that a command signal may be transmitted to each vehicle 226. The light synchronization system 100 may determine the flashing characteristics of the multiple asynchronous turn signals 228-1, 228-2, 228-3, 228-4, and 228-5 and may override such with the command signal that alters the flashing characteristics of turn signals 228. In a particular example, the synchronize module 118 may include instructions that cause the processor 110 to transmit a signal to a first vehicle 226-1 to alter the emission characteristics of the first vehicle exterior light to be synchronous with the emission characteristics of the second vehicle exterior light. The emission characteristics may include at least one of the lighting mode (e.g., solid or flashing), a flashing rate, and/or a flashing color. In an example, the signal transmitted to the various vehicles 226 is the same, meaning that upon executing the command, each vehicle 226 in the line flashes the respective turn signals 228 at the same frequency and/or color.

In an example, the synchronize module 116 includes instructions that cause the processor to determine the flashing characteristics of the presentation of the first vehicle exterior light and the presentation of the second vehicle exterior light based on the environment of the pedestrian 224. That is, certain lighting characteristics may be desirable under certain circumstances. For example, to safely navigate their path, other vehicles in the environment may rely on the turn signals of the left-turning vehicles 226 to know when it is safe to move. In these examples, a solid vehicle exterior light may be undesirable as motorists are accustomed to seeing flashing turn signals from nearby vehicles. In any case, the light synchronization system 100 of the present specification in this example modifies the real-world exterior vehicle lights to coincide with others, thereby reducing sensory overload that may result from asynchronously flashing vehicle lights.

Figure 5:
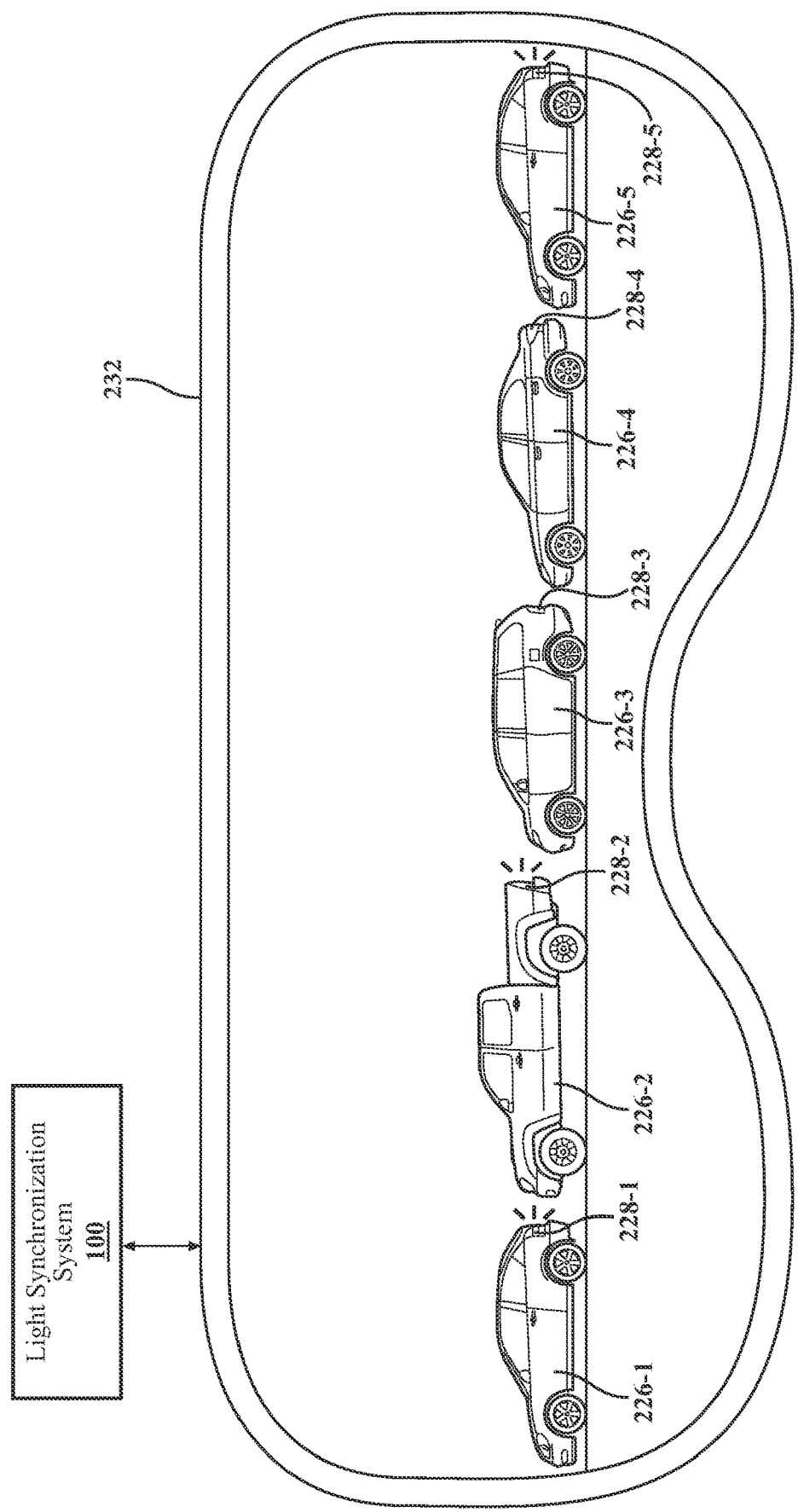
FIG. 5 illustrates an environment with asynchronous vehicle exterior lights as viewed through augmented reality (AR) glasses worn by a pedestrian.

FIG. 5 illustrates an environment with asynchronous vehicle exterior lights as viewed through an augmented reality (AR) display device 232 worn by a pedestrian 224. As described above, in one example, rather than altering the real-world emission characteristics of the vehicle turn signals 228-1, 228-2, 228-3, 228-4, and 228-5, the synchronize module 118 may include instructions that cause the processor 110 to superimpose an AR overlay of computer-generated synchronized vehicle turn signals over asynchronous real-world turn signals 228 viewed through an AR display device 232 worn by the pedestrian 224. As described above, the asynchronous blinking of lights may cause a pedestrian 224 to experience sensory overload. This situation is exacerbated considering vehicle lights may have different hues and sizes. In this example, the light synchronization system 100 synchronizes at least one of the lighting modes (e.g., solid or flashing), flashing, the color, and the size of the vehicle exterior lights. This is done via an AR display device 232, which may include a head-mounted display (HMD) such as AR glasses worn by the pedestrian 224, as depicted in FIG. 5.

In general, an AR display device 232 projects digital objects onto a transparent surface. The content may be aligned with the pedestrian's view and superimposed over real-world content viewed through the transparent surface. In the context of the present disclosure, the digital objects are synchronized vehicle exterior lights superimposed on top of the real-world vehicle exterior lights viewed through the AR display device 232.

To enable the digital projection of content on a transparent surface, an AR display device 232 may include various components, such as a combiner/display, cameras, sensors, processors (such as CPUs, GPUs), memory, and wireless transceivers. In general, a front-facing camera captures images of the field of view of the pedestrian 224. Processors in the AR display device 232 process the captured images and identify anchors within the real-world scene where digital content is to be overlaid. Anchoring may take various forms including simultaneous localization and mapping (SLAM), marker-based anchoring, and location-based anchoring. Once the location of the digital projections is identified via the anchors, the digital content is retrieved from the light synchronization system 100 and the AR display device 232 presents such on a suitable location (e.g., over the real-world vehicle exterior lights) within the field of view of the pedestrian 224. While FIG. 5 depicts the AR display device 232 as AR glasses, the AR display device 232 may take other forms, such as AR smart lenses and virtual retinal displays.

Figure 6A:
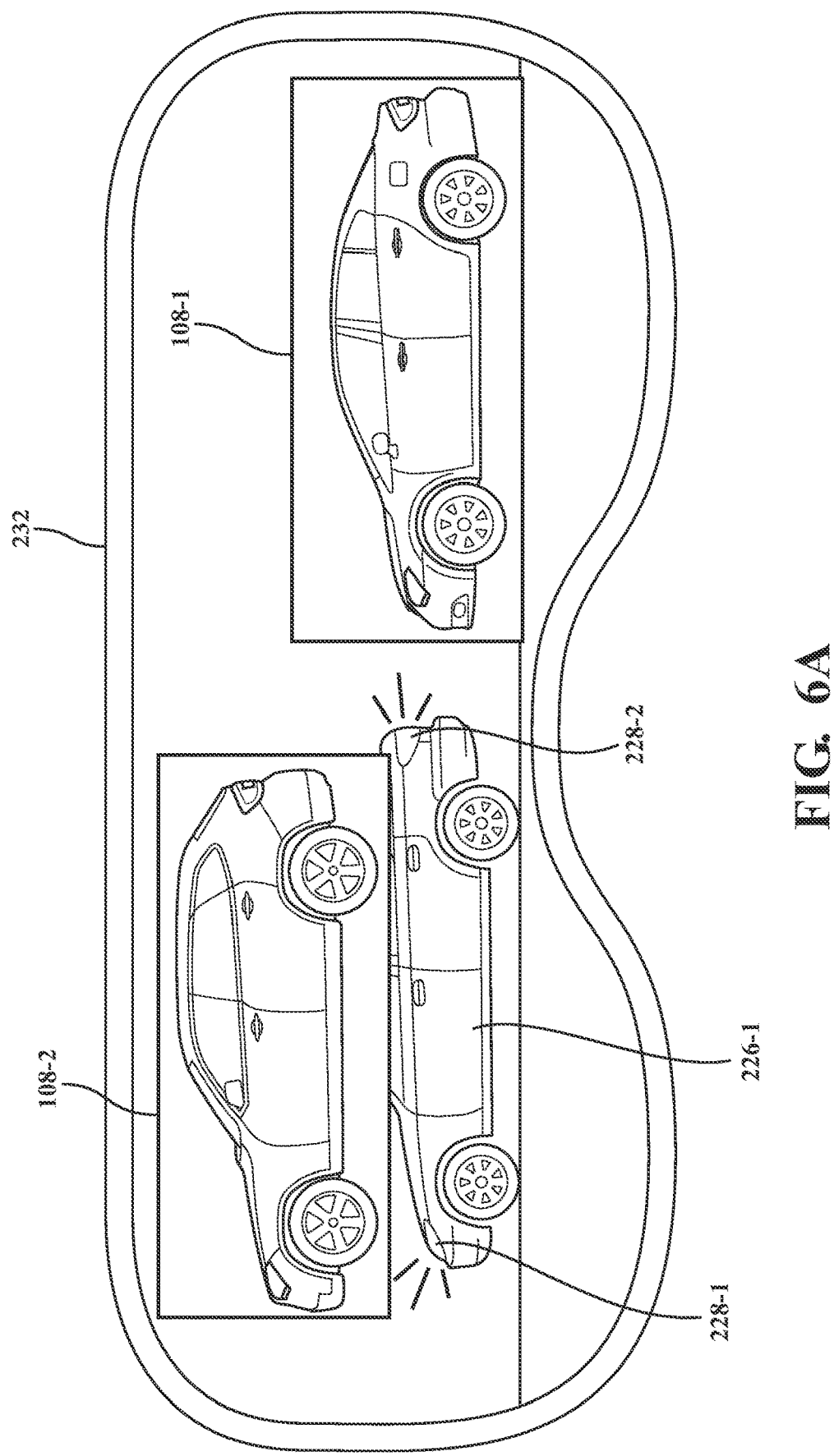
FIGS. 6A and 6B illustrate one embodiment of a light synchronization system that generates an augmented reality (AR) overlay of synchronized vehicle exterior lights to reduce the sensory overload of a pedestrian.
Figure 6B:
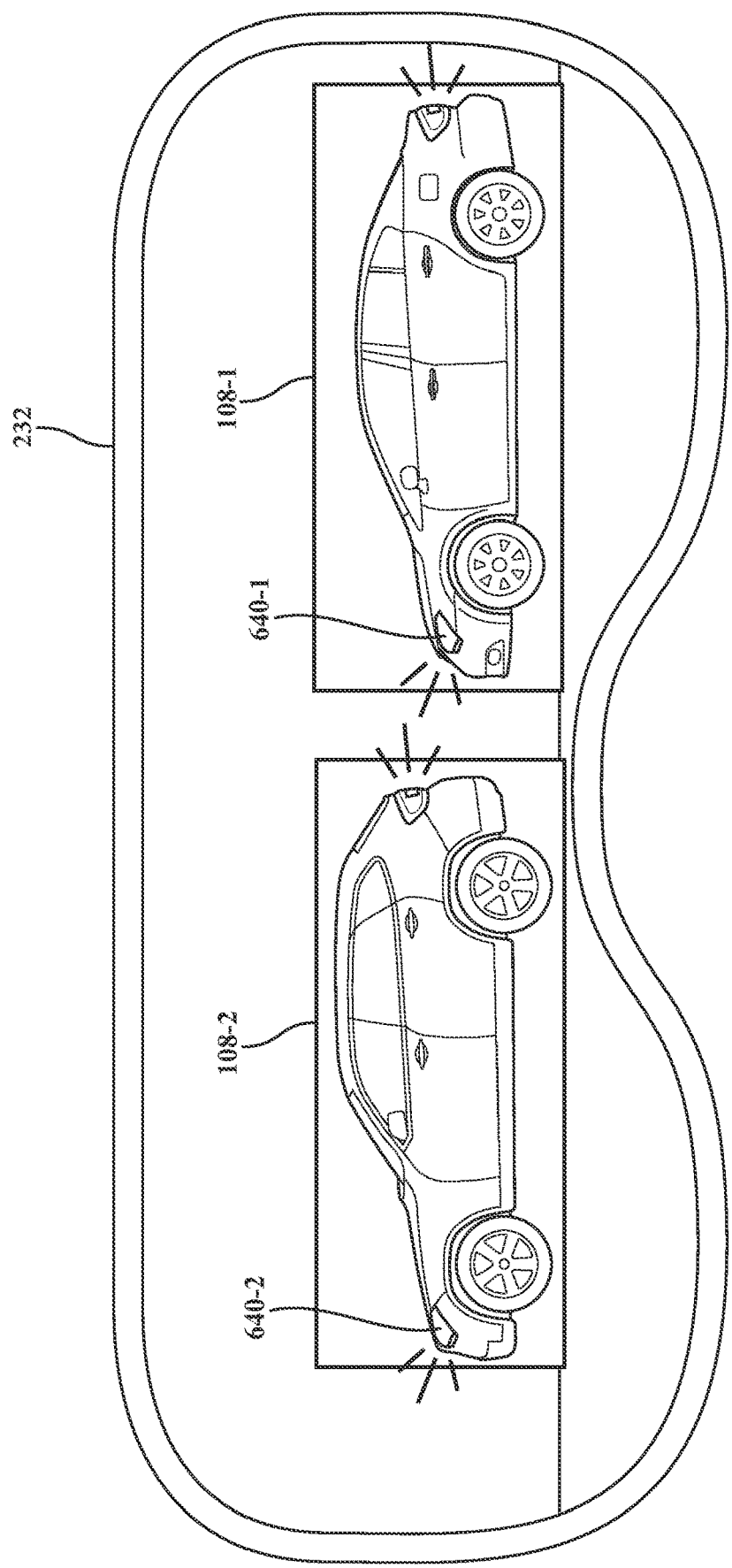

FIGS. 6A and 6B illustrate one embodiment of a light synchronization system 100 that generates an augmented reality (AR) overlay of synchronized vehicle exterior lights to reduce the sensory overload of a pedestrian 224. In some examples, it may be the case that the asynchronous real-world vehicle exterior lights may still be visible beneath the overlaid computer-generated synchronized lights. Accordingly, in an example, the synchronize module 118 includes instructions that cause the processor to conceal the asynchronous real-world vehicle exterior turn signals 228-1 and 228-2. FIGS. 6 and 6B depict such a process. First, as depicted in FIG. 6A, the synchronize module 118 may superimpose vehicle image(s) 108 of vehicle(s) 226 over the vehicles, wherein the vehicle image 108 or computer-generated representation conceals the asynchronous real-world turn signals 228-1 and 228-2 of the vehicle 226-1. As described above, the data store 102 may include vehicle images 108 of any vehicles that a pedestrian 224 may encounter on a road. Accordingly, the light synchronization system 100, via any number of mechanisms such as image analysis, a look-up table, or other mechanism, may identify a vehicle 226-1 in the field of view of the pedestrian 224. The synchronize module 118 may superimpose the vehicle images 108-1 and 108-2 over the corresponding real-world vehicle through the AR display device 232. Note that as described above, the database of vehicle images 108 may include representations of the vehicles 226-1 and 226-2 from a variety of angles such that regardless of the perspective of the pedestrian 224 relative to the vehicle 226-1 and 226-2, an appropriate vehicle image 108-1 and 108-2 may be extracted.

As depicted in FIG. 6A, the vehicle image(s) 108 of the vehicle are superimposed over the real-world vehicle(s) 226 viewed through the AR display device 232. Specifically, the first vehicle image, 108-1, has already been superimposed over its respective real-world counterpart viewed through the AR display device 232, while a second vehicle image, 108-2, is being superimposed over its respective real-world counterpart.

As depicted in FIG. 6B, with the real-world asynchronous vehicle exterior lights blocked, the synchronize module 118 superimposes the AR overlay of the computer-generated synchronized vehicle exterior lights 640-1 and 640-2 over the vehicle images 108-1 and 108-2 of the respective vehicles. That is, in FIG. 6A, the asynchronous vehicle exterior turn signals 228 are blocked while in FIG. 6B, computer-generated synchronous flashing lights are superimposed, thus resulting in an AR overlay of computer-generated synchronous vehicle exterior lights 640 over asynchronous vehicle exterior lights to reduce the sensory overload of the pedestrian 224.

As described above, in addition to synchronizing the flashing rate and the flashing color, the light synchronization system 100 of the present specification may synchronize other emission characteristics of the turn signals. For example, the synchronize module 118 may include instructions that cause the processor 110 to synchronize at least one of 1) a light flashing rate, a light flashing timing, a light color, a light shape, a light position, or a light movement. With regards to light movement, it may be that the turn signals 228 include multiple light-emitting diodes (LEDs) that may be illuminated in a sequence (e.g., left to right, right to left, up to down, down to up, circular movement, and spiral movement). In this example, the sequence of LED illumination of a turn signal may be synchronized such that the turn signals of each vehicle have matching light movement patterns.

As such, the light synchronization system 100 ensures synchronized flashing viewed by a pedestrian 224 to reduce the sensory overload of the pedestrian 224. As described above, the reduction in sensory overload may increase the overall safety and efficiency of road navigation as pedestrians who are otherwise compromised on account of sensory overload are returned to a state of mind where they may focus and properly appreciate and consider the environment in which they are found.

FIG. 7 illustrates one embodiment of a machine-learning light synchronization system 100 associated with synchronizing the presentation of vehicle exterior lights to reduce sensory overload of a pedestrian 224. Specifically, FIG. 7 depicts the state module 116, which in one embodiment with the state model 106, administers a machine learning algorithm to generate an indication of a sensory state 748 for the pedestrian 224 (e.g., whether overloaded or not), which indication may trigger the synchronization of a presentation of a vehicle exterior lights when indicative of sensory overload.

As described above, the machine-learning model may take various forms, including a machine-learning model that is supervised, unsupervised, or reinforcement-trained. In one particular example, the machine-learning model may be a neural network that includes any number of 1) input nodes that receive sensor data 104 and environment data 742, 2) hidden nodes, which may be arranged in layers connected to input nodes and/or other hidden nodes and which include computational instructions for computing outputs, and 3) output nodes connected to the hidden nodes which generate an output indicative of the sensory state 748 of the pedestrian 224.

As described above, the state module 116 may rely on baseline sensor data to infer the sensory state of the pedestrian 224. Specifically, the state module 116 includes instructions that cause the processor 110 to compare the sensor data 104 to baseline sensor data, where the baseline sensor data includes historical sensor data for the pedestrian and/or historical sensor data for a different pedestrian. That is, the state module 116 may acquire baseline pedestrian data 744, stored as sensor data 104 in the data store 102, and baseline population data 746, which is also stored as sensor data 104 in the data store 102. The baseline sensor data may be characterized by whether or not it represents sensory overload. That is, the pedestrian 224 and other users may exhibit certain patterns when their senses are overstimulated and other patterns when their senses are not. The baseline sensor data may reflect both of these conditions. The state module 116, whether supervised, unsupervised, or reinforcement-trained, may detect similarities and deviations between the behaviors of the pedestrian 224 with the patterns identified in the baseline pedestrian data 744 and/or the baseline population data 746 with the similarities and deviations indicating a sensory state of the pedestrian 224.

As an example, sensor data 104 may indicate that the pedestrian 224 heart rate and GSR are at elevated levels as compared to baseline pedestrian data 744. As another example, sensor data 104 may indicate that the pedestrian 224 is performing certain movement behaviors such as squinting and/or covering their eyes with their hand, which behaviors are unexpected, as indicated in the baseline sensor data, when a pedestrian is not overstimulated. In this example, the state module 116, relying on a machine-learning state model 106 and environment data 742 indicating a potentially overstimulating sensory environment, generates an indication that the pedestrian 224 is in an overloaded sensory state 748. Note that while a few examples of sensor data 104 (i.e., increased heart rate, increased GSR, and certain movement behaviors) are relied on in generating an indication, the state module 116 may consider several factors when outputting an indication. That is, it may be that one characteristic by itself is inconclusive to determine sensory overload. As such, the state module 116 relies on multiple data points from sensor data 104 and the baseline sensor data to infer the sensory state 748 of the pedestrian 224.

Note that in some examples, the machine-learning model is weighted to rely more heavily on baseline pedestrian data 744 than baseline population data 746. That is, while certain global behaviors may indicate sensory overload, some users behave in a way that deviates from the global behavior but does not constitute sensory overload. For example, a pedestrian may have a naturally elevated heart rate or may naturally walk at a slower rate than the general population. Given that it is the standard or baseline behavior for this particular pedestrian 224, these behavior patterns may not indicate sensory overload. As such, the state module 116 may weigh the sensor data 104 associated with the pedestrian more heavily than the sensor data 104 associated with the additional individuals.

As stated above, the state module 116 considers different deviations when generating an indication of sensory overload. However, as each deviation from baseline data may not conclusively indicate sensory overload, the state module 116 considers and weights different deviations when generating the indication. For example, as described above, the state module 116 may consider the quantity, frequency, and degree of deviation between the sensor data 104 and the baseline data 744 and 746 when generating the indication.

In an example, if the deviation is greater by some threshold than the baseline sensor data, the state module 116 outputs an indication of the sensory state 748 of the pedestrian, which indication may be binary or graduated. For example, if the frequency, quantity, and degree of deviation surpass a threshold, the state module 116 may indicate that the pedestrian is sensory overloaded. By comparison, if the frequency, quantity, and degree of deviation do not surpass the threshold, the state module 116 may indicate that the pedestrian 224 is not sensory overloaded. In another example, the output may indicate a degree of sensory overload, which may be determined based on the frequency, quantity, and degree of deviation of the sensor data 104 from the baseline data 744 and 746.

In any case, the indication may be passed to the state module 116 to refine the machine-learning algorithm. For example, the pedestrian 224 may be prompted to evaluate the classification provided. This pedestrian feedback may be transmitted to the state module 116 such that future classifications may be generated based on the correctness of past classifications. That is, feedback from the pedestrian 224 or other sources may be used to refine the state module 116 to infer the pedestrian sensory state 748 more accurately based on measured sensor data 104.

Figure 8:
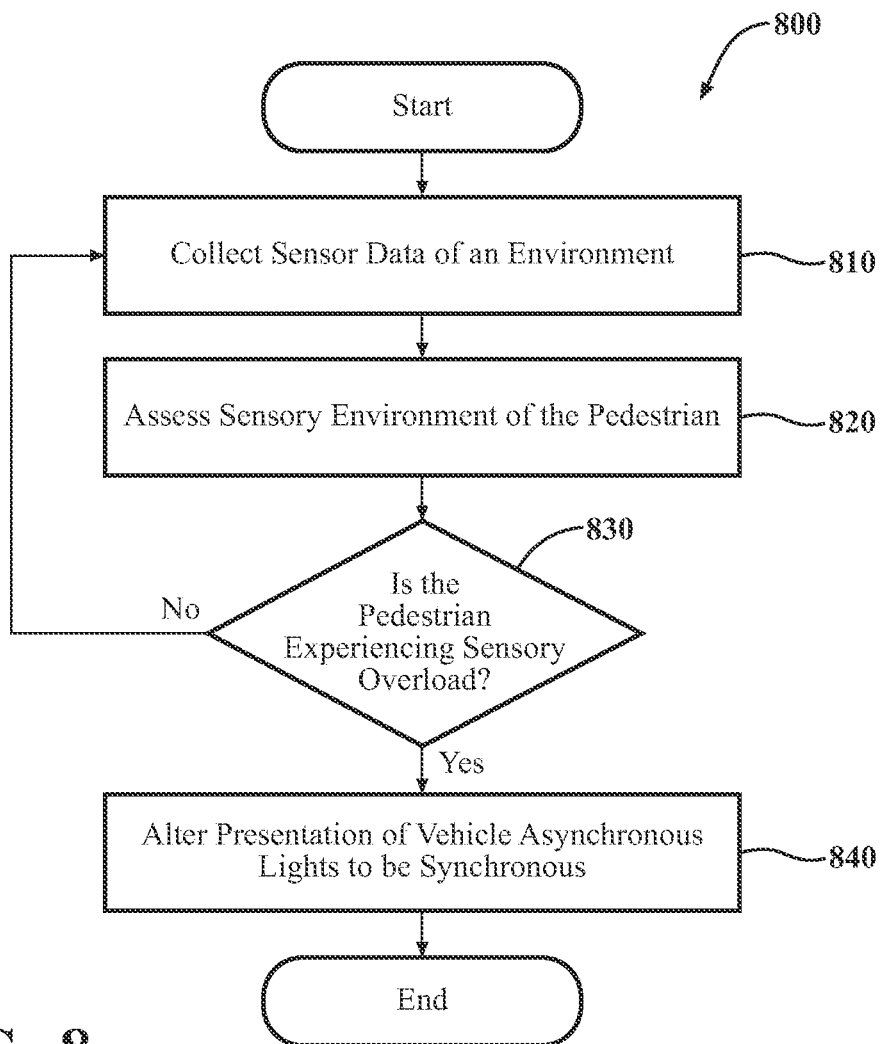
FIG. 8 illustrates a flowchart for one embodiment of a method that is associated with synchronizing vehicle exterior lights to reduce the sensory overload of a pedestrian.

Additional aspects of synchronizing the presentation of vehicle exterior lights will be discussed in relation to FIG. 8. FIG. 8 illustrates a flowchart of a method 800 that is associated with synchronizing the presentation of vehicle exterior lights. Method 800 will be discussed from the perspective of the light synchronization system 100 of FIGS. 1 and 2. While method 800 is discussed in combination with the light synchronization system 100, it should be appreciated that the method 800 is not limited to being implemented within the light synchronization system 100 but is instead one example of a system that may implement the method 800.

At 810, the light synchronization system 100 may collect the sensor data 104 from an ego sensor 230 of a user device of a pedestrian 224 and environment sensors 234 of vehicles 226 and/or infrastructure elements 227. In one embodiment, the light synchronization system 100 controls any radar sensor, LiDAR sensor, or camera of the vehicle(s) 226 or infrastructure element 227 to observe the pedestrian and surrounding sensory environment as well as any biometric ego sensor 230 to observe biometric data of the pedestrian 224.

Moreover, in further embodiments, the light synchronization system 100 controls the sensors to acquire the sensor data 104 at successive iterations or time steps. Thus, the light synchronization system 100, in one embodiment, iteratively executes the functions discussed at blocks 810-830 to acquire the sensor data 104 and provide information therefrom. Furthermore, the light synchronization system 100, in one embodiment, executes one or more of the noted functions in parallel for separate observations in order to maintain updated perceptions. Additionally, as previously noted, the light synchronization system 100, when acquiring data from multiple sensors, fuses the data together to form the sensor data 104 and to provide for improved determinations of detection, location, and so on.

At 820, the environment module 114 evaluates the sensory environment of the pedestrian 224. As described above, some environments may be more likely to cause sensory overload in a pedestrian 224. Examples of such environments include those with many flashing lights. By comparison, an environment with a lesser quantity of flashing lights may be less prone to result in pedestrian 224 sensory overload. The environment module 114 includes an image processor that processes captured images (from a camera of an AR display device, user device, vehicle, or infrastructure element) to determine the quality and nature of the light sources in the environment to determine, against some threshold, whether or not the environment could be deemed sensory overload inducing. As described above, the threshold may be specific to and selected by the pedestrian 224 or set by a manufacturer, engineer, or other entity based on medical recommendations.

At 830, the state module 116 determines whether the pedestrian 224 is in a sensory overloaded state based on 1) a characteristic of the sensory environment (i.e., environment data 742) and 2) sensor data 104 indicative of a pedestrian state of mind. As described above, sensor data 104, which may include biometric data and data indicating the physical traits/movements of the pedestrian 224, may provide insight as to whether a pedestrian 224 is experiencing sensory overload in an overstimulating environment or whether the pedestrian 224 is unaffected, at least to a degree that could cause potential risk to the pedestrian 224, by the sensory environment. The state module 116 compares both pieces of information (i.e., the environment data 742 and sensor data 104) to determine whether a pedestrian is experiencing sensory overload.

As described above, such a determination may be based on a comparison of the sensor data 104 to baseline sensor data, which baseline sensor data, as noted above, may be associated with the particular pedestrian or other pedestrians. The baseline sensor data represents expected or anticipated traits/behavior based on historical patterns for the pedestrian and/or other pedestrians. Specifically, the state module 116 identifies deviations between the currently measured sensor data 104 and the baseline sensor data.

If the state module 116 determines that the pedestrian 224 is not in a sensory overloaded state, then the light synchronization system 100 continues monitoring sensor data 104 and environment data 742. If the pedestrian 224 is experiencing sensory overload, then at 840, the synchronize module 118 alters the presentation of vehicle exterior lights, whether that be by altering the real-world vehicle exterior lights as described in connection with FIGS. 3 and 4 or superimposing computer-generated and synchronized vehicle exterior lights on top of real-world vehicle exterior lights as viewed through an AR display device 232 worn by the pedestrian 224 as described in connection with FIGS. 5-6B. In either case, the present system, methods, and other embodiments promote the safety of all road users by identifying pedestrians who are experiencing sensory overload and reducing their sensory overload to promote a safer environment for pedestrians and vehicles.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:
1. A system, comprising:
a processor; and
a non-transitory memory storing machine-readable instructions that, when executed by the processor, cause the processor to:
assess a sensory environment of a pedestrian;
collect sensor data indicative of a pedestrian state of mind;

determine that the pedestrian is in a sensory-overloaded state based on a characteristic of the sensory environment and the sensor data indicative of the pedestrian state of mind; and synchronize a presentation of a first vehicle exterior light and a presentation of a second vehicle exterior light based on a determination that the pedestrian is in the sensory-overloaded state.

2. The system of claim 1, wherein the machine-readable instruction that, when executed by the processor, causes the processor to synchronize the presentation of the first vehicle exterior light and the presentation of the second vehicle exterior light comprises a machine-readable instruction that, when executed by the processor, causes the processor to superimpose an augmented reality (AR) overlay of computer-generated synchronized vehicle exterior lights over asynchronous real-world vehicle exterior lights viewed through an AR display device worn by the pedestrian.

3. The system of claim 2, wherein the machine-readable instruction that, when executed by the processor, causes the processor to superimpose the AR overlay of computer-generated synchronized vehicle exterior lights over the asynchronous real-world vehicle exterior lights comprises a machine-readable instruction that, when executed by the processor, causes the processor to superimpose computer-generated synchronized vehicle exterior lights that are synchronized with respect to at least one of:
 a flashing rate;
 a flashing timing;
 a color;
 a shape;
 a position; or
 a light movement.

4. The system of claim 2, wherein the machine-readable instruction that, when executed by the processor, causes the processor to superimpose the AR overlay of computer-generated synchronized vehicle exterior lights over the asynchronous real-world vehicle exterior lights comprises a machine-readable instruction that, when executed by the processor, causes the processor to conceal the asynchronous real-world vehicle exterior lights.

5. The system of claim 4, wherein the machine-readable instruction that, when executed by the processor, causes the processor to superimpose the AR overlay of computer-generated synchronized vehicle exterior lights over the asynchronous real-world vehicle exterior lights comprises machine-readable instructions that, when executed by the processor, cause the processor to:
 superimpose a digital image of a vehicle over the vehicle viewed through the AR display device, wherein the digital image conceals the asynchronous real-world vehicle exterior lights of the vehicle; and
 superimpose the AR overlay of computer-generated synchronized vehicle exterior lights over the digital image.

6. The system of claim 1, wherein the machine-readable instruction that, when executed by the processor, causes the processor to synchronize the presentation of the first vehicle exterior light and the presentation of the second vehicle exterior light comprises a machine-readable instruction that, when executed by the processor, causes the processor to transmit a signal to a first vehicle to alter emission characteristics of the first vehicle exterior light to be synchronous with emission characteristics of the second vehicle exterior light.

7. The system of claim 6, wherein the machine-readable instruction that, when executed by the processor, causes the processor to synchronize the presentation of the first vehicle exterior light and the presentation of the second vehicle exterior light comprises a machine-readable instruction that, when executed by the processor, causes the processor to determine flashing characteristics of the first vehicle exterior light and the second vehicle exterior light based on an environment of the pedestrian.

8. The system of claim 1, wherein the machine-readable instruction that, when executed by the processor, causes the processor to assess the sensory environment of the pedestrian comprises a machine-readable instruction that, when executed by the processor, causes the processor to determine flashing characteristics of multiple asynchronous vehicle exterior lights.

9. The system of claim 1, wherein the machine-readable instruction that, when executed by the processor, causes the processor to determine that the pedestrian is in the sensory-overloaded state comprises a machine-readable instruction that, when executed by the processor, causes the processor to assess at least one of biometric data for the pedestrian or images of the pedestrian to determine that the pedestrian is in the sensory-overloaded state.

10. The system of claim 1, wherein:
 the machine-readable instruction that, when executed by the processor, causes the processor to determine that the pedestrian is in the sensory-overloaded state comprises a machine-learning instruction that, when executed by the processor, causes the processor to compare the sensor data to baseline sensor data; and
 the baseline sensor data comprises at least one of:
  historical sensor data for the pedestrian; or
  historical sensor data for a different pedestrian.

11. The system of claim 1, wherein the machine-readable instructions further comprise a machine-readable instruction that, when executed by the processor, causes the processor to produce a notification of a sensory-overloaded pedestrian to at least one of:
 a human vehicle operator;
 an autonomous vehicle system; or
 an infrastructure element.

12. A non-transitory machine-readable medium comprising instructions that, when executed by a processor, cause the processor to:
 assess a sensory environment of a pedestrian;
 collect sensor data indicative of a pedestrian state of mind;
 determine that the pedestrian is in a sensory-overloaded state based on a characteristic of the sensory environment and the sensor data indicative of the pedestrian state of mind; and
 synchronize a presentation of a first vehicle exterior light and a presentation of a second vehicle exterior light based on a determination that the pedestrian is in the sensory-overloaded state.

13. The non-transitory machine-readable medium of claim 12, wherein the instruction that, when executed by the processor, causes the processor to synchronize the presentation of the first vehicle exterior light with the second vehicle exterior light comprises an instruction that, when executed by the processor causes the processor to superimpose an augmented reality (AR) overlay of computer-generated synchronized vehicle exterior lights over asynchronous real-world vehicle exterior lights viewed through an AR display device worn by the pedestrian.

14. The non-transitory machine-readable medium of claim 13, wherein the instruction that, when executed by the processor, causes the processor to superimpose the AR overlay of computer-generated synchronized vehicle exterior lights over the asynchronous real-world vehicle exterior lights comprises an instruction that, when executed by the processor, causes the processor to conceal the asynchronous real-world vehicle exterior lights.

15. The non-transitory machine-readable medium of claim 12, wherein the instruction that, when executed by the processor, causes the processor to synchronize the presentation of the first vehicle exterior light with the second vehicle exterior light comprises an instruction that, when executed by the processor causes the processor to transmit a signal to a first vehicle to alter flashing characteristics of the first vehicle exterior light to be synchronous with flashing characteristics of the second vehicle exterior light.

16. The non-transitory machine-readable medium of claim 12, wherein:
the instruction that, when executed by the processor, causes the processor to determine that the pedestrian is in the sensory-overloaded state comprises an instruction that, when executed by the processor, causes the processor to compare the sensor data to baseline sensor data; and
the baseline sensor data comprises at least one of:
historical sensor data for the pedestrian; or
historical sensor data for a different pedestrian.

17. A method, comprising:
assessing a sensory environment of a pedestrian;
collecting sensor data indicative of a pedestrian state of mind;
determining that the pedestrian is in a sensory-overloaded state based on a characteristic of the sensory environment and the sensor data indicative of the pedestrian state of mind; and
synchronizing a presentation of a first vehicle exterior light and a presentation of a second vehicle exterior light based on a determination that the pedestrian is in the sensory-overloaded state.

18. The method of claim 17, wherein synchronizing the presentation of the first vehicle exterior light with the second vehicle exterior light comprises superimposing an augmented reality (AR) overlay of computer-generated synchronized vehicle exterior lights over asynchronous real-world vehicle exterior lights viewed through an AR display device worn by the pedestrian.

19. The method of claim 17, wherein synchronizing the presentation of the first vehicle exterior light with the second vehicle exterior light comprises transmitting a signal to a first vehicle to alter flashing characteristics of the first vehicle exterior light to be synchronous with flashing characteristics of the second vehicle exterior light.

20. The method of claim 17, wherein:
determining that the pedestrian is in the sensory-overloaded state comprises comparing, via machine-learning the sensor data to baseline sensor data; and
the baseline sensor data comprises at least one of:
historical sensor data for the pedestrian; or
historical sensor data for a different pedestrian.

21. A system, comprising:
a processor; and
a non-transitory memory storing machine-readable instructions that, when executed by the processor, cause the processor to:
assess a sensory environment of a pedestrian;
determine that the pedestrian is in a sensory-overloaded state based on:
a characteristic of the sensory environment; and
a comparison of sensor data indicative of a pedestrian state of mind and baseline sensor data, the baseline sensor data comprises historical sensor data; and
synchronize a presentation of a first vehicle exterior light and a presentation of a second vehicle exterior light based on a determination that the pedestrian is in the sensory-overloaded state.

\* \* \* \* \*